(12) United States Patent
Finke et al.

(10) Patent No.: US 12,352,317 B2
(45) Date of Patent: Jul. 8, 2025

(54) DISCONNECT MECHANISMS

(71) Applicant: Hamilton Sundstrand Corporation, Charlotte, NC (US)

(72) Inventors: Aaron M. Finke, Janesville, WI (US); Gabriella Crisanti, Kensworth Dunstable (GB); Michael James Dawson, Bristol (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/466,376

(22) Filed: Sep. 13, 2023

(65) Prior Publication Data

US 2024/0101266 A1 Mar. 28, 2024

(30) Foreign Application Priority Data

Sep. 23, 2022 (EP) ..................................... 22197559

(51) Int. Cl.
*F16D 11/14* (2006.01)
*B64D 35/025* (2024.01)

(52) U.S. Cl.
CPC ............ *F16D 11/14* (2013.01); *B64D 35/025* (2024.01); *F16D 2300/22* (2013.01)

(58) Field of Classification Search
CPC ...... F16D 11/14; F16D 11/04; F16D 2300/22; F16D 2023/123; F16D 23/12; B64D 35/025; F16F 15/16; F16F 15/0232; F16F 2222/126; F16F 2230/30; F16F 2232/08; F16F 2234/02
See application file for complete search history.

(56) References Cited

U.S. PATENT DOCUMENTS

| 9,546,722 B2 | 1/2017 | Fox |
| 9,784,380 B2 | 10/2017 | Lemmers, Jr. |
| 2021/0033030 A1 | 2/2021 | Flower |
| 2021/0394600 A1* | 12/2021 | Absenger ............... H02K 7/116 |

(Continued)

FOREIGN PATENT DOCUMENTS

| GB | 2572427 A | 10/2019 |
| WO | 2021181105 A1 | 9/2021 |

OTHER PUBLICATIONS

European Search Report for Application No. 22197559.2, mailed Mar. 17, 2023, 7 pages.

*Primary Examiner* — Farhana Pervin
(74) *Attorney, Agent, or Firm* — CANTOR COLBURN LLP

(57) ABSTRACT

A drive mechanism for use with an electric motor and a clutch mechanism includes a rotor shaft, a disconnect shaft, a disconnect mechanism, at least one damper element, and a part of a clutch. The rotor shaft and disconnect shaft have a longitudinal axis A. The disconnect shaft transmits torque between the rotor shaft and the clutch mechanism. The disconnect shaft comprises the part of the clutch and a shaft element. The disconnect mechanism is configured to move the disconnect shaft between an engaged position in which the part of the clutch is engaged with the clutch mechanism and a disengaged position in which the part of the clutch is not engaged with the clutch mechanism. The at least one damper element is configured to absorb at least part of any kinetic energy introduced into the disconnect shaft due to movement of the disconnect shaft.

13 Claims, 4 Drawing Sheets

(56) References Cited

U.S. PATENT DOCUMENTS

| | | | | |
|---|---|---|---|---|
| 2022/0329181 A1* | 10/2022 | Allias | ............... | B64D 41/00 |
| 2023/0021085 A1* | 1/2023 | Allias | ............... | B64D 35/02 |
| 2023/0137247 A1* | 5/2023 | Kelly | ............... | H02K 7/108 |
| | | | | 290/52 |

* cited by examiner

DISCONNECT MECHANISMS

CROSS REFERENCE TO RELATED APPLICATIONS

This application claims priority to European Patent Application No. 22197559.2 filed Sep. 23, 2022, the entire contents of which is incorporated herein by reference.

BACKGROUND

This disclosure relates to disconnect mechanisms and, in particular, disconnect mechanisms for use in aircraft propulsion systems that include an internal combustion engine and an electrical motor that supply torque to the same gearbox.

SUMMARY

According to a first aspect of the present disclosure there is provided a drive mechanism for use with a rotating machine and a clutch mechanism, in which the drive mechanism comprises a rotor shaft, a disconnect shaft, a disconnect mechanism, at least one damper element, and a part of a clutch. The rotor shaft and disconnect shaft have a longitudinal axis A. The disconnect shaft transmits torque between the rotor shaft and the clutch mechanism. The disconnect shaft comprises the part of the clutch and a shaft element, and the disconnect mechanism is configured to move the disconnect shaft between an engaged position in which the part of the clutch is engaged with the clutch mechanism and a disengaged position in which the part of the clutch is not engaged with the clutch mechanism. The at least one damper element is configured to absorb at least part of any kinetic energy introduced into the disconnect shaft as a result of the movement of the disconnect shaft from the engaged position to the disengaged position.

In an embodiment of the above embodiment, the disconnect shaft and the first part of the clutch are separate elements that are joined to each other so that the disconnect shaft and the part of the clutch are effectively a single unit.

In an alternative embodiment of the above embodiment, the disconnect shaft and the part of a clutch are integral on a single unit.

Unless otherwise stated or the context requires otherwise, use of disconnect shaft herein is to be understood to reference the disconnect shaft alone when part of the disconnect shaft forms a first part of the clutch mechanism or the disconnect shaft and first part of the clutch.

When the drive mechanism of the present disclosure is in use and the disconnect shaft is in the engaged position, the disconnect shaft rotates around the longitudinal axis A and torque is transmitted between the rotating machine and the clutch mechanism via the rotor shaft and the disconnect shaft. When it is desired to decouple the rotating machine from the clutch mechanism the disconnect mechanism is activated and the disconnect shaft is moved to the disengaged position. This occurs whilst the rotor shaft and disconnect shaft are both rotating about the longitudinal axis A. The activation of the disconnect mechanism combined with the release of frictional forces within the clutch mechanism that occurs as the disconnect shaft is disconnected from the clutch mechanism can have, in combination, the result that the translational kinetic energy (movement in an axial direction away from the clutch mechanism) is introduced into the disconnect shaft as it is moved to the disengaged position. For example, it has been found that when a dog clutch is rotating at around 12,000 rpm (around 1257 rad/s) the disconnect shaft is propelled away from the other part of the dog clutch at a speed of around 100 inches per second (around 2.54 m/s).

An advantage of the drive mechanism of the present disclosure is that the at least one damper element will absorb and dissipate the translational kinetic energy introduced to the disconnect shaft. This minimises the risk of damage to the disconnect shaft or other elements of the drive mechanism as a result of that translational kinetic energy.

In an embodiment of any of the above embodiments, the rotor shaft comprises an axially extending void, the rotor shaft and disconnect shaft are co-axial, the disconnect shaft is at least partially positioned within the void, and the movement of the disconnect shaft between the engaged position and disengaged position is in an axial direction. The rotor shaft and disconnect shaft are so configured that torque may be transmitted between the rotor shaft and disconnect shaft, and the configuration allows transmission of torque throughout the axial movement of the disconnect shaft.

In an embodiment of any of the above embodiments, one of the rotor shaft and the disconnect shaft comprises one or more male splines, and the other of the rotor shaft and the disconnect shaft comprises one or more female splines. The male and female splines are configured to mesh with each other, and the torque may be transmitted between the rotor shaft and disconnect shaft through the male and female splines.

In an embodiment of any of the above embodiments, the axially extending void within the rotor shaft has a substantially circular cross section in a plane perpendicular to the longitudinal axis A, and at least the portion of the disconnect shaft that is typically within the axially extending void also has a substantially circular cross section in a plane perpendicular to the longitudinal axis A.

In an alternative embodiment of any of the above embodiments, the axially extending void within the rotor shaft has a non-circular cross section in a plane perpendicular to the longitudinal axis A, and at least the portion of the disconnect shaft that is typically within the axially extending void also has the same non-circular cross section as the axially extending void in a plane perpendicular to the longitudinal axis A. In some embodiments that non-circular cross section is a hexagonal or other polygonal cross section and the disconnect shaft has the same cross section. In such embodiments interlocking of the rotor shaft and the disconnect shaft causes transmission of torque between the rotor shaft and the disconnect shaft.

In an embodiment of any of the above embodiments, the drive mechanism further comprises a chamber and the chamber is defined by the rotor shaft, the disconnect shaft, and one or more seal elements. Each seal element is a dynamic seal and extends between the rotor shaft and the disconnect shaft, and each seal element makes, creates, or forms a fluid tight seal between the rotor shaft and disconnect shaft. The or each dynamic seal is configured to allow the disconnect shaft to move at least a predetermined distance in an axial direction relative to the rotor shaft.

In an embodiment of any of the above embodiments, there are two seal elements, the seal elements are axially spaced from each other, and the chamber is axially between the seal elements.

In an embodiment of any of the above embodiments, the chamber has an axial first end and an axial second end, the first end is further from the clutch mechanism than the second end, each end of the chamber is at least partially formed by a seal element, and the cross-sectional area of the axially extending void adjacent the seal element of the first end is smaller than the cross-sectional area of the axially extending void adjacent the seal element of the second end.

In an embodiment of any of the above embodiments, the rotor shaft and disconnect shaft are so configured that movement of the disconnect shaft between the engaged position and disengaged position causes the volume of the chamber to decrease.

In an embodiment of any of the above embodiments, the chamber may comprise a first, second and third zone, the first zone extends from the first end towards the second end to a first intermediate position, the faces of the rotor shaft and disconnect shaft defining the first zone are parallel with each other and the axis A, the third zone extends from the second end towards the first end to a second intermediate position, the faces of the rotor shaft and disconnect shaft defining the third zone are parallel with each other and the axis A, the second zone extends between the first and second intermediate positions, and the first intermediate position is closer to the first end than the second intermediate position. In this embodiment the cross sectional area of the first zone is smaller than the cross sectional area of the third zone, both cross sections being in a plane perpendicular to the axis A. In this embodiment, when the portion of the disconnect shaft in the third zone moves towards the first zone the volume of the chamber decreases because the portion of the disconnect shaft in the third zone sweeps through a greater volume than the portion of the disconnect shaft in the first zone and the overall volume thus decreases by the difference between the volumes swept through by those portions.

In an embodiment of any of the above embodiments, the drive mechanism further comprises a biasing means, and the biasing means is configured to bias the disconnect shaft toward the engaged position.

In an embodiment of any of the above embodiments, the biasing means comprises a spring. In some embodiments the spring is a compression spring, in some embodiments a helical compression spring or a wave compression spring. In some alternative embodiments the spring is a tension spring, in some embodiments a helical tension spring.

In an embodiment of any of the above embodiments, the biasing means is located within the axially extending void, and the biasing means extends between the rotor shaft and the disconnect shaft. In some embodiments one or both of the rotor shaft and the disconnect shaft includes a stop element with which the biasing element interacts.

In an embodiment of any of the above embodiments, the damper element comprises one or more of the chamber, each seal element, and the biasing means.

The chamber acts to absorb the translational kinetic energy in the following fashion: The movement of the disconnect shaft causes the chamber to reduce in volume and, as a result, the pressure of the gas in the chamber increases. With continued movement of the disconnect shaft the chamber becomes increasingly resistant to a further decrease in volume the translational kinetic energy converts to heat in the gas and increased gas pressure.

The seal elements absorb translational kinetic energy as a result of friction between them and one or both of the rotor shaft and/or the disconnect shaft.

The biasing means absorbs translational energy by deforming thus absorbing translational energy.

In an embodiment of any of the above embodiments, the clutch mechanism is a dog clutch, and the part of a clutch is one of the tooth supporting elements of the dog clutch.

According to a second aspect of the present disclosure there is provided an electric motor comprising a drive mechanism according to the first aspect of the present disclosure.

In an embodiment of any of the above embodiments, the electric motor further comprises a stator and an armature, in which the armature is fixed to the rotor shaft.

According to a third aspect of the present disclosure there is provided an aircraft propulsion system comprising an electric motor according to the second aspect of the present disclosure, an internal combustion engine, a gearbox, a propeller drive shaft and a propeller in which the electric motor and internal combustion engine both supply torque to the gearbox.

According to a fourth aspect of the present disclosure there is provided an aircraft comprising at least one aircraft propulsion system according to the third aspect of the present disclosure.

BRIEF DESCRIPTION OF THE DRAWINGS

The present disclosure will be further described and explained by way of example with reference to the accompanying drawings in which.

DETAILED DESCRIPTION

Figure 1:
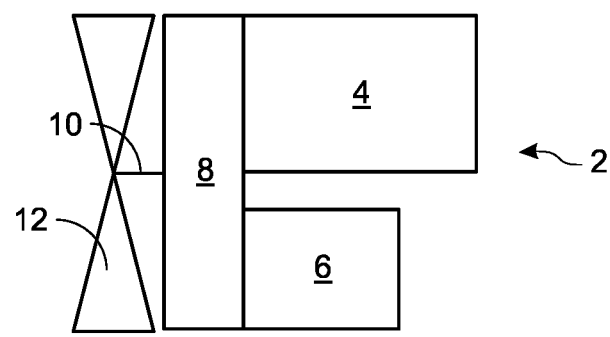
FIG. 1 shows a schematic embodiment of an aircraft propulsion system according to the present disclosure.

With reference to FIG. 1, an aircraft propulsion system 2 includes an internal combustion engine 4 and an electric motor 6. The internal combustion engine 4 and electric motor 6 are both coupled to a gearbox 8 via an internal combustion engine drive shaft (not shown) and an electric motor drive shaft 96 (shown in FIGS. 2 and 3) respectively, and configured to input torque or rotational motion into the gearbox 8 via those drive shafts. The gearbox 8 outputs torque/rotational motion to a propeller 12 via a propeller shaft 10.

In use, it is sometimes desirable, for example at takeoff, that the aircraft propulsion system 2 is configured so that the internal combustion engine 4 and electric motor 6 are both coupled to and supplying torque/rotational motion to the gearbox 8 and thus to the propeller 12 via the propeller shaft 10. At other times, for example when the aircraft is cruising, torque/rotational motion from the electric motor 6 is not required.

When torque/rotational motion from the electric motor 6 is not required, it may be desirable that the electric motor is disengaged or decoupled from the gearbox 8 so as to minimise wear on the components of the electric motor 6, and to maximise the efficiency of the propulsion system 2. The efficiency of propulsion system 2 is maximised by disengaging the electric motor 6 from the gearbox 8 because continued coupling of the electric motor 6 to the gearbox 8 when the electric motor 6 is not being powered by an electrical power source forces rotation of the electric motor 6 which is powered by the internal combustion engine 4 and causes the electric motor 6 to act as an electrical generator.

It is frequently the case that disengagement of the gearbox 8 from the electric motor 6 has to take place whilst the internal combustion engine 4 is driving the gearbox 8 and, as a result, whilst the drive shaft 96 between the gearbox 8 and the electric motor 6 is rotating at high speeds, for example at around 12,000 rpm (around 1257 rad/s).

Figure 2:
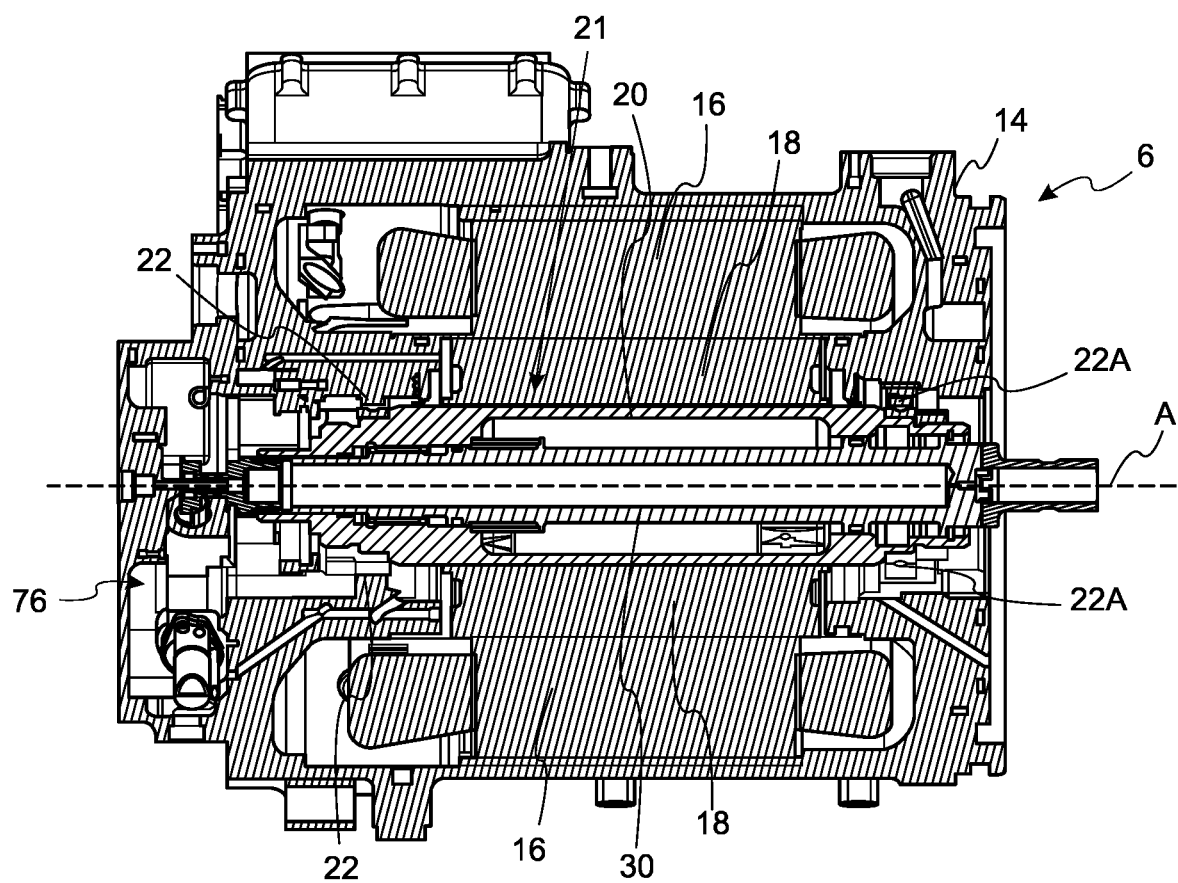
FIG. 2 shows a schematic embodiment of an electric motor according to the present disclosure when the electric motor is engaged with the gearbox of the aircraft propulsion system of FIG. 1.

With reference to FIG. 2, the electric motor 6 includes a housing 14 within which are located a stator 16 which is fixed to the housing 14, an armature 18 which is mounted on a rotor shaft 20, and a drive mechanism 21. The drive mechanism 21 includes the rotor shaft 20 and a disconnect shaft 30.

The rotor shaft 20 is supported in the housing 14 via rotary bearings 22, 22A. The rotary bearings 22, 22A allow the rotor shaft 20 to rotate around the rotor shaft's longitudinal axis A. Operation of the electric motor 6 causes the armature to rotate within the space defined by the stator 16 and as a result the rotor shaft 20 to rotate around axis A.

With reference to FIGS. 2 to 7, the rotor shaft 20 has first and second ends 32, 34, an outer surface 24 and includes an axially extending or inner void 26 which is defined by an inner surface 28.

The armature 18 is fixed to the outer surface 24 of the rotor shaft 20.

The inner void 26 extends the length of the rotor shaft 20 and extends between a first mouth 46 at the first end 32 of the rotor shaft, and a second mouth 48 at the second end 34 of the rotor shaft. The inner surface 28 defining the inner void 26 has, at any axial position along the rotor shaft 20 a circular or substantially circular cross section in the plane perpendicular to axis A.

Extending along and through most of the inner void 26 is a disconnect shaft 30 with a central axis common with that of the rotor shaft 20. The disconnect shaft 30 has first and second disconnect shaft ends 50, 52 which are close to the first and second mouths 46, 48 of the rotor shaft 20 respectively. The first disconnect shaft end 50 is a located a short distance into the inner void 26 from the first mouth 46, and the second disconnect shaft end 52 extends out of the second mouth 48 of the rotor shaft 20. At least a portion, and in some embodiments at least most of the length of the disconnect shaft 30 has a circular cross section in the plane perpendicular to the axis A.

The inner void 26 is formed of first, second and third zones 54, 56, 58 which each extend in the axial direction. The first, second and third zones 54, 56, 58 may be referred to as first, second and third axial zones.

At least a portion, and in some embodiments substantially all, of the first axial zone 54 of the inner void 26 has cross section of diameter D1. The diameter D1 and the outside diameter of the portion of the disconnect shaft 30 that sits within or is adjacent the first axial zone 54 are such that the disconnect shaft 30 is a sliding or loose fit within the inner surface 28 of the rotor shaft 20.

At least a portion, and in some embodiments substantially all, of the second axial zone 56 of the inner void 26 has a cross section of diameter D2. The diameter D2 and the outside diameter of the portion of the disconnect shaft 30 that sits within the second axial zone 56 are such that there is a chamber 60 formed between and largely defined by the outer surface 62 of that portion of the disconnect shaft 30 and the inner surface 28 of the rotor shaft 20.

At least a portion, and in some embodiments substantially all, of the third axial zone 58 of the inner void 26 has a cross section of diameter D3. The diameter D3 and the outside diameter of the portion of the disconnect shaft 30 that sits within or is adjacent the third axial zone 58 are such that the disconnect shaft 30 is a sliding or loose fit within the inner surface 28 of the rotor shaft 20.

The diameter D1 is smaller than the diameter D3 which is smaller than the diameter D2. For example, the diameter D1 may be 30 mm, diameter D3 may be 35 mm, and diameter D2 may be 50 mm. Diameters D1, D2 and D3 may be of other dimensions with D1<D3<D2 in other embodiments.

Within the first axial zone 54 an axially extending portion of the inner surface 28 of the rotor shaft 20 is configured to form a plurality of parallel axially extending female spline teeth that extend into the inner void 26. The spline teeth are circumferentially and evenly spaced around the inner surface 28.

Also within the first axial zone 54 an axially extending portion of the outer surface 62 of the disconnect shaft 30 is configured to form a plurality of parallel axially extending grooves or male spline teeth that extend from the disconnect shaft 30. The grooves are circumferentially and evenly spaced around the outer surface 62.

The male and female spline teeth, which may be collectively termed the spline 42, are configured to mesh or engage with each other to allow the transmission of torque/rotational motion between the rotor shaft 20 and the disconnect shaft 30.

The spline 42 is so configured that one of the male and female spline teeth can move at least a predetermined distance D4 in an axial direction relative to the other of the male and female spline teeth and remain meshed or engaged with each other.

In other non-illustrated embodiments of the present disclosure other configurations of the male and female spline teeth may be used. For example, the male spline teeth may be in the rotor shaft 20 and the female spline teeth on the disconnect shaft 30.

Further located in the first axial zone 54 is a first seal element 64 which extends between the inner surface 28 or the rotor shaft 20 and the outer surface 62 of the disconnect shaft 30. The first seal element 64 is dynamic seal suitable for allowing relative axial movement between the rotor shaft 20 and the disconnect shaft 30. The first seal element 64 is configured to prevent the passage of fluid, for example lubricant, typically oil, or gas, typically atmosphere, past the seal.

Located in the third axial zone 58 is a second seal element 66 which extends between the inner surface 28 or the rotor shaft 20 and the outer surface 62 of the disconnect shaft 30. The second seal element 66 is dynamic seal suitable for allowing relative axial movement between the rotor shaft 20 and the disconnect shaft 30. The second seal element 66 is adapted to prevent the passage of fluid, for example lubricant, typically oil, or gas, typically atmosphere, past the seal.

One or both of the first and second seal elements 64, 66 may be located in a groove in one of the inner surface 28 of the rotor shaft 20 or the outer surface 62 of the disconnect shaft 30 in the first and third axial zones 54, 58 respectively. The other of the inner surface 28 of the rotor shaft 20 and the outer surface 62 of the disconnect shaft 30 is smooth to allow the axial movement of the inner surface 28 of the rotor shaft 20 and the outer surface 62 of the disconnect shaft 30 relative to each other without causing damage to the seal elements 64, 66.

The effect of the first and second seal elements 64, 66 is that the chamber 60 is hermetically sealed. That sealing and the different diameters D1 and D3 of the inner void 26 and the disconnect shaft 30 in the first and third axial zones 54, 58 has the effect that any axial movement of the disconnect shaft 30 relative to the rotor shaft 20 causes the volume of the chamber 60 to change and as a result the pressure of the gas, typically atmospheric gas, within the chamber 60 to increase or decrease. Specifically, because diameter D1 is smaller than diameter D3, when the disconnect shaft moves in the direction 44 the volume of chamber 60 gets larger, and when the disconnect shaft moves in the direction opposite to direction 44 the volume of chamber 60 gets smaller. The pressure of the gas in chamber 60 accordingly decreases and increases respectively.

A further effect of the first and second seals 64, 66 is that oil or other lubricant is prevented from entering the chamber 60.

The portion of the disconnect shaft 30 that constantly remains within the second axial zone 56 supports a first stop element 68. The first stop element 68 is so configured that it engages with a first end of a reset spring 70. The reset spring 70 extends between the first stop element 68 on the disconnect shaft 30 and a second stop element 72 on the rotor shaft 20.

The reset spring 70 is, in the illustrated embodiment of the present disclosure, a compression spring. The reset spring 70 is configured to bias the first and second stop elements 68, 72 away from each other, and as a result, to bias the disconnect shaft 30 in the direction 44 (the direction extending from the first mouth 46 to the second mouth 48 of the rotor shaft 20).

In other, non-illustrated embodiments of the present disclosure, the reset spring is a tension spring and the first and second stop elements are so located that the reset spring is configured to bias the first and second stop elements towards each other, and as a result, to bias the disconnect shaft in the direction 44.

The first end 50 of the disconnect shaft 30 is engaged with a disconnect mechanism 76.

Figure 4:
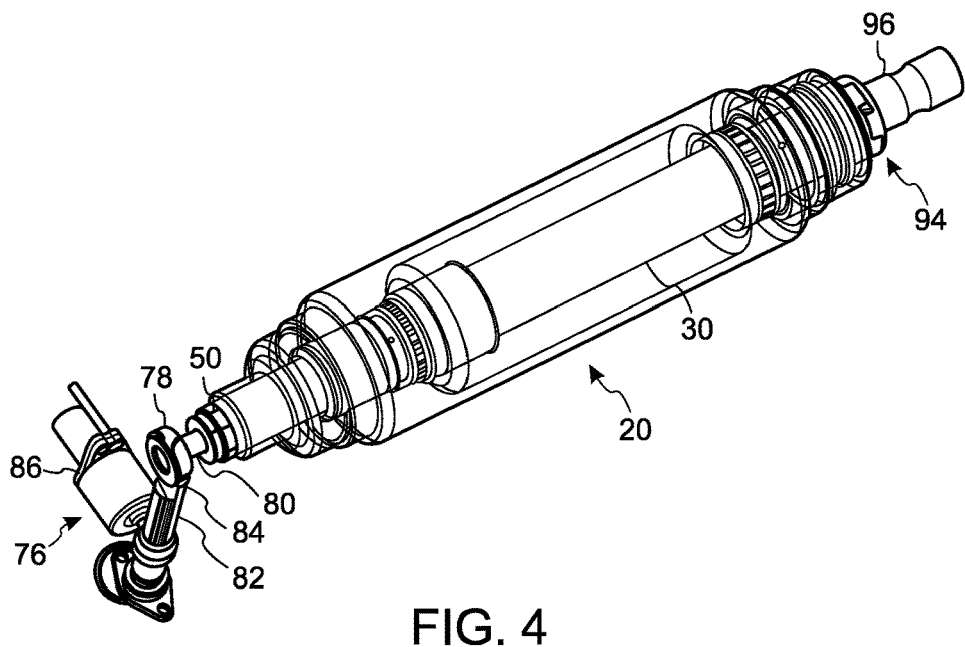
FIG. 4 shows a schematic perspective view of the drive mechanism of the electric motor of FIG. 2 when the electric motor is engaged with the gearbox of the aircraft propulsion system of FIG. 1.
Figure 5:
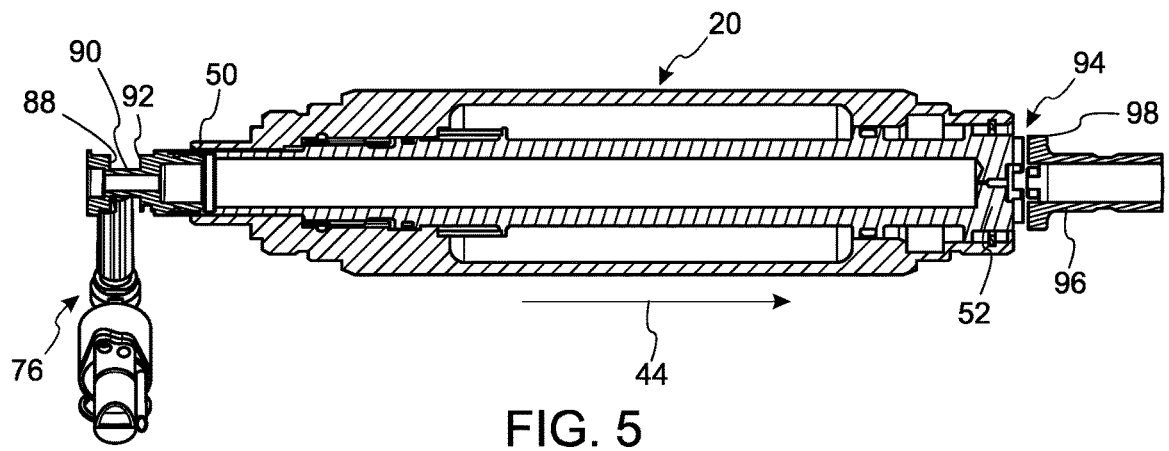
FIG. 5 shows a schematic and partially sectioned view of an embodiment of a drive mechanism of the electric motor of FIG. 2 when the electric motor is disengaged from the gearbox of the aircraft propulsion system of FIG. 1.
Figure 7:
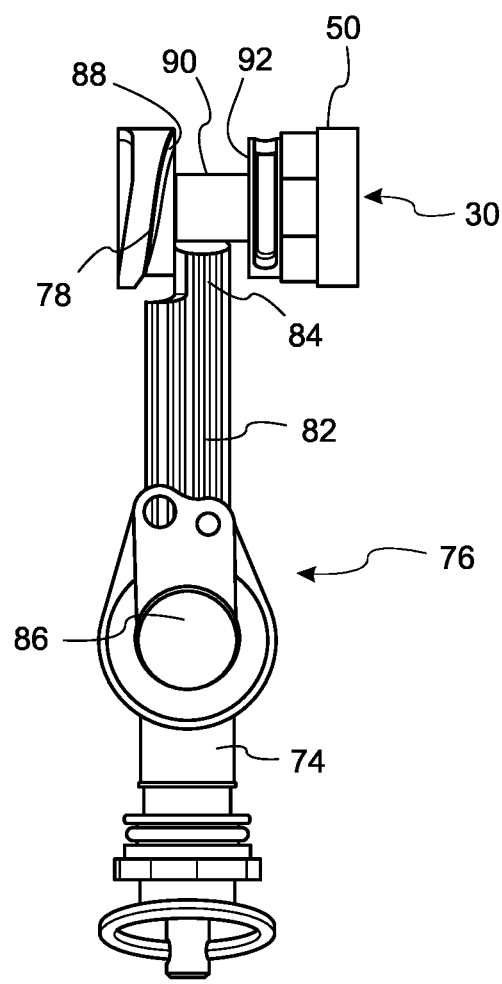
FIG. 7 shows an enlarged detail of FIG. 3.

As may best be seen in FIGS. 4, 5 and 7, the disconnect mechanism 76 includes an end shaft 78 which is attached to the end 50 of the disconnect shaft 30 by an appropriate attachment means. The end shaft 78 is co-axial with the disconnect shaft 30.

The end shaft 78 defines a circumferential disconnect groove 80 which is defined by an actuation face 88, a groove base 90, and a passive face 92. The groove base 90 extends axially between the actuation face 88 and passive face 92. The actuation face 88 is further from the disconnect shaft 30 than the passive face 92.

The disconnect mechanism 76 further includes an actuation shaft 82 which has an actuation end 84. The actuation shaft 82 may be caused to translate towards the end shaft 78 by an actuator 86 and a biasing element 74. Biasing element 74 is typically a spring. The actuation end 84 and disconnect groove 80 are so configured that the actuation end 84 does not extend into the disconnect groove 80 during normal operation. That predetermined position may be termed the inactive position.

The actuation end 84 and disconnect groove 80 are further so configured that when the actuation shaft 82 is translated out of the inactive position the actuation end 84 engages the actuation face 88 of the groove 80 and impels/moves the end shaft 78, and as a result disconnect shaft 30, in the opposite direction to direction 44. The movement of the end shaft 78 and disconnect shaft 30 in the opposite direction to direction 44 is movement of more than distance D4 (shown in FIG. 6 and discussed below).

Figure 6:
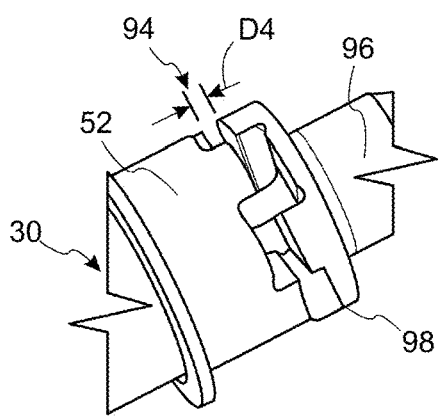
FIG. 6 shows an enlarged perspective detail of FIG. 5.

With reference to FIG. 6, the second end 52 of the disconnect shaft 30 is configured as one half of a dog clutch 94. The other half of the dog clutch 94 is formed by an end 98 of a drive shaft 96 that is connected to the gearbox 8. The dog clutch 94 is so configured that separation of the halves of the dog clutch 94 in the axial direction by a distance greater than D4 causes the axially extending teeth of the dog clutch 94 to disengage from each other.

The disengagement between the gearbox 8 and the electric motor 6 occurs when the teeth on the two halves of the dog clutch 94 cease to be engaged with each other.

The functioning of the drive mechanism 21 the present disclosure is described by example as follows:

Before the propulsion system 2 of the aircraft is activated a user of the aircraft or an automated engine management system will ensure that the actuator shaft 82 of the disconnect mechanism 76 is in the inactive position, As a result (i) the shaft end 84 of the actuator shaft 82 is not in contact with the actuation face 88 of the disconnect groove 80; (ii) the reset spring 70 biases the disconnect shaft 30 in direction 44; and (iii) the teeth of the two halves of the dog clutch 94 are engaged with each other.

Figure 3:
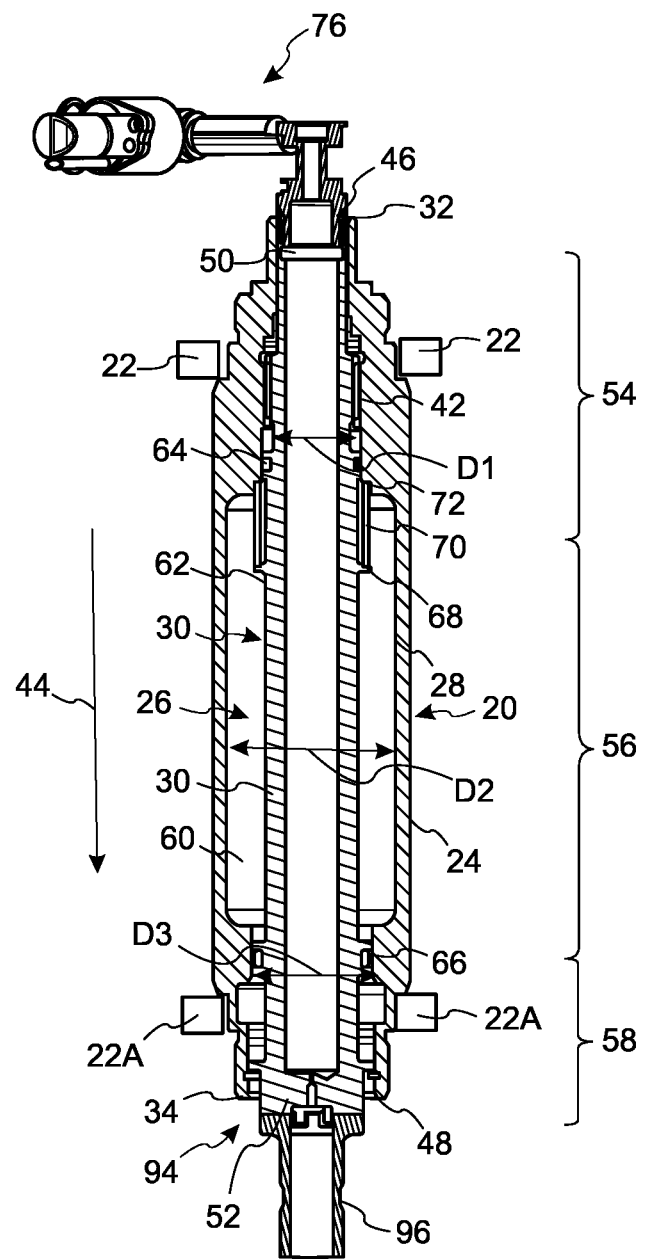
FIG. 3 shows a schematic and partially sectioned view of an embodiment of a drive mechanism of the electric motor of FIG. 2 when the electric motor is engaged with the gearbox of the aircraft propulsion system of FIG. 1.

Activation of the electric motor 6 by supply of electric current to one or both of the stator 16 and armature 18 causes the armature 18 and rotor shaft 20 to rotate about the axis A of the rotor shaft 20. The splines 42 between the rotor shaft 20 and disconnect shaft 30 cause the rotation of the rotor shaft 20 to be transmitted to the disconnect shaft 30, and the second end 52 of the disconnect shaft/one half of the dog clutch 94 to rotate. This drives the other half 98 of the dog clutch 94 and thus the drive shaft 96. Torque is thus transmitted from the electric motor 6 to the gearbox 8. This configuration is shown in FIGS. 2 to 4.

When it is desired that the electric motor 6 is no longer coupled to the gearbox 8, that is the electric motor 6 cannot transmit or receive torque/rotational motion to or from the gearbox 8, a user or engine management mechanism activates the actuator 86 of the disconnect mechanism 76. This causes the actuator shaft 82 to translate towards the end shaft 78 and the actuator shaft end 84 to contact the actuator face 88 of the disconnect groove 80. The contact of the actuator shaft end 84 with the actuator face 88 impels the end shaft 78 and disconnect shaft 30 in the direction opposite to direction 44. As a result, the second end 52 of the disconnect shaft 30/half of the dog clutch 94 moves away from the other half 98 of the dog clutch 94 by more than distance D4.

The activation of the disconnect mechanism 76 combined with the release of frictional forces within the dog clutch 94 that occurs as the disconnect shaft 30 is disconnected from the other half 98 of the dog clutch 94 can have, in combination, the result that the translational kinetic energy (movement in an axial direction away from the clutch mechanism) is introduced into the disconnect shaft 30 as it is moved to the disengaged position. For example, when the dog clutch mechanism 94 is rotating at around 12,000 rpm (around 1257 rad/s) the disconnect shaft 30 is propelled in the direction opposite to direction 44 at a speed of around 100 inches per second (around 2.54 m/s).

The movement of the disconnect shaft 30 that results from the separation of the dog clutch mechanism is slowed/the transitional kinetic energy is absorbed or dissipated by a combination of effects:

(i) The friction between the first and second seal elements 64, 66 and the outer surface 62 of the disconnect shaft 30 or the inner surface 28 of the rotor shaft 20;

(ii) The movement of the rotor shaft 20 in the direction opposite to the direction 44 causing the volume of the chamber 60 to decrease, the pressure of the gas held in the chamber to increase, and that pressure to resist further movement of the rotor shaft 20 in the direction opposite to the direction 44; and (iii) The movement of the rotor shaft 20 in the direction opposite to the direction 44 causing the reset spring 70 to be compressed or further compressed.

The slowing of the disconnect shaft/absorption or dissipation of the translational kinetic energy by the above effects is relatively gentle and avoids impacts and potentially damaging shockwaves from being propagated through the rotor shaft 20 and electric motor 6 as a whole.

The interaction of the shaft end 84 and actuation face 88 holds the disconnect shaft in a position where the halves 52, 98 of the dog clutch 94 are not engaged until it is desired to re-engage the electric motor 6 and gearbox 8.

When it is desired to re-engage the halves 52, 98 of the dog clutch 94 with each other, the actuator shaft 82 is retracted back to the inactive position. The reset spring 70 will at the same time push the disconnect shaft 30 and second end 52 of the disconnect shaft 30 into engagement with the other half 98 of the dog clutch 94.

The above description is meant to be exemplary only, and one skilled in the art will recognize that changes may be made to the embodiments described without departing from the scope of the disclosure. Still other modifications which fall within the scope of the present disclosure will be apparent to those skilled in the art, in light of a review of this disclosure.

Various aspects of the mechanism disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A drive mechanism for use with an electric motor and a clutch mechanism, the drive mechanism comprising:
a rotor shaft;
a disconnect shaft, wherein the rotor shaft and disconnect shaft have a longitudinal axis A;
a disconnect mechanism;
at least one damper element; and
a part of a clutch;
wherein:
the disconnect shaft transmits torque between the rotor shaft and the clutch mechanism;
the disconnect shaft comprises the part of the clutch and a shaft element;
the disconnect mechanism is configured to move the disconnect shaft between an engaged position in which the part of the clutch is engaged with the clutch mechanism and a disengaged position in which the part of the clutch is not engaged with the clutch mechanism; and
the at least one damper element is configured to absorb at least part of any kinetic energy introduced into the disconnect shaft as a result of the movement of the disconnect shaft from the engaged position to the disengaged position;
wherein:
the rotor shaft comprises an axially extending void;
the rotor shaft and disconnect shaft are co-axial;
the disconnect shaft is at least partially positioned within the void;
the movement of the disconnect shaft between the engaged position and disengaged position is in an axial direction;
the rotor shaft and disconnect shaft are so configured that torque may be transmitted between the rotor shaft and disconnect shaft, and the configuration allows transmission of torque throughout the axial movement of the disconnect shaft;
the drive mechanism further comprises a chamber;
the chamber is defined by the rotor shaft, the disconnect shaft, and one or more seal elements;
each seal element extends between the rotor shaft and disconnect shaft; and
each seal element makes a fluid tight seal between the rotor shaft and disconnect shaft.

2. The drive mechanism according to claim 1, wherein:
one of the rotor shaft and the disconnect shaft comprises one or more male splines;
an other of the rotor shaft and the disconnect shaft comprises one or more female splines;
the male and female splines are configured to mesh with each other; and
the torque may be transmitted between the rotor shaft and disconnect shaft through the male and female splines.

3. The drive mechanism according to claim 1, wherein:
there are two seal elements;
the seal elements are axially spaced from each other; and
the chamber is axially between the seal elements.

4. The drive mechanism according to claim 3, wherein:
the chamber has an axial first end and an axial second end;
the first end is further from the clutch mechanism than the second end;
each end of the chamber is at least partially formed by a seal element; and
the cross-sectional area of the axially extending void adjacent the seal element of the first end is smaller than the cross-sectional area of the axially extending void adjacent the seal element of the second end.

5. The drive mechanism according to claim 1, wherein the rotor shaft and disconnect shaft are so configured that movement of the disconnect shaft between the engaged position and disengaged position causes the volume of the chamber to decrease.

6. The drive mechanism according to claim 1, wherein the drive mechanism further comprises:
a biasing means configured to bias the disconnect shaft toward the engaged position.

7. The drive mechanism according to claim 6, wherein the biasing means is a spring.

8. The drive mechanism according to claim 6, wherein biasing means is located within the axially extending void, and the biasing means extends between the rotor shaft and the disconnect shaft.

9. The drive mechanism according to claim 1, wherein:
the damper element comprises one or more of the chamber, each seal element, and the biasing means.

10. The drive mechanism according to claim 1, wherein the clutch mechanism is a dog clutch and the part of a clutch is one of the tooth supporting elements of the dog clutch.

11. An electric motor comprising:
a drive mechanism according to claim 1.

12. The electric motor according to claim 11, further comprising:
a stator; and
an armature, wherein the armature is fixed to the rotor shaft.

13. An aircraft propulsion system comprising:
the electric motor according to claim 12;
an internal combustion engine;
a gearbox;
a propeller drive shaft; and
a propeller;
wherein the electric motor and internal combustion engine both supply torque to the gearbox.

* * * * *